United States Patent Office 3,409,557
Patented Nov. 5, 1968

3,409,557
PROCESS FOR PREPARING THORIUM DIOXIDE-URANIUM DIOXIDE SOL
Frederick T. Fitch, Shaker Heights, Ohio, and Jean G. Smith, Baltimore, Md., assignors to W. R. Grace & Co., New York, N.Y., a corporation of Connecticut
No Drawing. Continuation-in-part of application Ser. No. 408,407, Nov. 2, 1964. This application Dec. 21, 1966, Ser. No. 603,449
8 Claims. (Cl. 252—301.1)

ABSTRACT OF THE DISCLOSURE

A process for preparing stable thorium dioxide-uranium dioxide aquasols suitable for use in nuclear ceramics by autoclaving sols of thorium dioxide and uranium dioxide or mixtures of slurries of thorium and uranium hydroxide, wherein both the thorium and uranium are in the plus four oxidation state, and recovering the product sol.

This invention is a continuation-in-part of U.S. Ser. No. 408,407 of Fitch et al., filed Nov. 2, 1964, now abandoned.

This invention relates to a process for preparing metal oxide sols. In particular, it relates to a process for preparing stable thorium dioxide-uranium dioxide aquasols especially suitable for use in nuclear ceramics.

Colloidal particles consisting of thorium dioxide-uranium dioxide in intimate association within each particle are useful as nuclear fuels. When clad with silica as described by Hurley, Tecotzsky and Vanik in copending application Ser. No. 290,171, filed June 24, 1963, now U.S. Patent 3,325,419, the sols constitute a stable, non-eroding fuel for homogeneous reactors. The sols may also be mixed with ceramic powders, dried and fired to yield nuclear ceramics. They may be injected as droplets into a water immiscible solvent and thereby dehydrated to form microspheres, an important type of nuclear fuel. The colloidal particles may also be separated from th dispersing medium by centrifugation, vacuum distillation, extraction, etc. and used in powder form for ceramic applications. The thorium dioxide-uranium dioxide colloidal materials are very reactive both in sintering to high density at lower temperatures than conventional ceramic powders and in forming desired solid solution phases with other constituents. The presence of 20 mole percent or more thoria in a uranium dioxide fuel has the added advantage of stabilizing the uranium against oxidation. The prevention of oxidation is important because it avoids disruption of the fuel element with the consequent loss of fission products.

The conventional method for preparing thorium dioxide-uranium dioxide solid solutions consists of sintering mixtures of thorium hydroxide and ammonium diuranate at temperatures of at least 1000° C. in a reducing atmosphere.

We have found a method for preparing thorium dioxide-uranium dioxide sols in which the component oxides are associated within the sol particles as a solid solution or as an intimate mixture which forms a solid solution on heating to about 400° C. or higher. The ability to form the solid solution at such a low temperature as compared to the conventional temperature of 1000° C. is obviously beneficial. In addition, use of our sols for forming the solid solutions provides the thorium dioxide-uranium dioxide in a form that can be uniformly blended with another material. Both of these factors are distinct advantages in the nuclear ceramics field.

The thorium dioxide-uranium dioxide sols of our invention can be conveniently prepared by autoclaving either a mixture of the reactive thoria and urania sols, or a mixed basic salt solution of thorium and uranium (IV). By the term "urania sol" is meant the hydrous oxide of uranium in the +4 valence state; by the term "basic salt solution" is meant a salt in which some of the four anion valence sites (preferably 2) are filled with the hydroxyl radical (OH−).

The component reactive sols can be prepared separately by an convenient method, such as by (1) electrodialysis, (2) ion exchange of the respective salt solutions or (3) peptization of the freshly precipitated and washed hydrous oxide. These component sols can be then mixed together before autoclave treatment.

The alternate starting material, the basic salt solution, can be separately prepared by (1) treating a neutral salt with an anion exchange resin in the hydroxyl form, (2) adding ammonia and stopping the addition just before precipitation, or (3) precipitating the hydrous oxides and then adding sufficient acid to just dissolve.

This basic salt solution can also be prepared from a mixture of the thorium and uranium neutral salts which were simultaneously formed into the basic salts, or from a mixture of the separately prepared basic salts.

In the above procedures, suitable anion exchange resins for the ion exchange treatment include any freshly regenerated anion or weakly basic resin available commercially.

The mixture of thorium and uranium, whether as reactive sols or as a basic salt solution, and whether prepared separately or together, are placed in any autoclave or sealed pressure vessel to interact and densify. The autoclave atmosphere may either be an inert or a reducing atmosphere. Nitrogen is the preferred atmosphere, but helium, argon and other inert gases can be used, in addition to hydrogen. The autoclaving is preferably carried for 8 hours at 150° C. Temperature from about 100 to 200° C. can be used, however. The length of time for the autoclaving is a function of temperature, and varies from about 1 to about 40 hours accordingly.

The autoclaving step converts the reactive sols or basic salt solutions of thorium and uranium to the stable thorium dioxide-uranium dioxide aquasol.

The hydroxyl ion for the formation of the aquasol in the instant process is provided by the water. This is emphasized by the examples. In Example 1, for instance, the pH of the chloride solution before autoclaving was 3.7 and after autoclaving the pH had dropped to 1.98, clearly indicating that the water furnishes the hydroxyl ions for sol formation. The process of this invention can be represented by chemical formulae as follows:

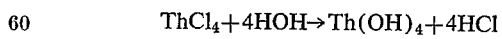

$ThCl_4 + 4HOH \rightarrow Th(OH)_4 + 4HCl$

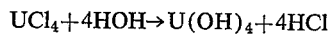

$UCl_4 + 4HOH \rightarrow U(OH)_4 + 4HCl$

For best results, the total thorium and uranium concentration (as oxides) in the sols or basic salts to be autoclaved should be about 1 to 150 grams per liter, with about 1 to 100 grams per liter preferred. The mole percent range of thoria to urania is 0.1–99.9 $ThO_2$ to 99.9–0.1 $UO_2$.

After the sol has been formed, it must be further treated to remove electrolytes and to concentrate it, if desired. The sol is most conveniently concentrated where the colloidal phase is flocculated during autoclaving. In this case, the bulk of the electrolytes can be removed by simply decanting the supernatant liquids. Sols which do not flocculate during preparation are centrifuged to bring down the dispersed phase, followed by decantation to remove the electrolytes. The solids remaining after decantation are redispersed in deionized water to give the desired sol concentration.

As an alternate procedure, the sol may be purified by passing through a commercially available anion exchange resin in the hydroxyl form and then concentrated by evaporation.

The product sols are black and do not settle on standing. Electron microscopy shows the sols to be composed of particles from about 3 to about 12 millimicrons in size with a mean particle size of about 5 millimicrons. These particles may, in turn, associate to form aggregates which are, of course, larger than the individual particles; i.e., up to a size of about 100 millimicrons. The sols display an X-ray diffraction pattern for a single, poorly crystallized phase with a lattice constant which indicates that at least part of both components have entered into a solid solution. The material which does not contribute to the diffraction pattern is amorphous.

Complete solid solution formation is accomplished by separating the dispersed phase as, for example, by centrifuging, and heating the residue to above about 400° C. in either an inert or reducing atmosphere.

It is difficult to determine the extent of solid solution formation in the dispersed phase of thorium dioxide-uranium dioxide sols since the lattice constant varies with the amount of excess over stoichiometric oxygen. The cell contracts as the $x$ in $U_yTh_{1-y}O_{2+x}$ increases toward 0.34. Hence, when the interstitial oxygen content is unknown, thorium dioxide-uranium dioxide solid solution compositions cannot be accurately determined from lattice constant values. It is therefore difficult to establish the degree of solid solution formation within the dispersed phase. It is more readily determined after the dispersed phase has been heated in a reducing atmosphere to remove interstitial oxygen. Such heat treatment simultaneously promotes thorium dioxide-uranium dioxide interaction.

The X-ray diffraction studies were made on a Norelco Diffractometer with Cu K $\alpha$ radiation. Sol conductivity was measured with a commercially available conductivity bridge and sol pH was measured with a commercially available pH meter.

Our invention will be further explained by the following specific but non-limiting examples.

Example 1

The preferred method of preparation of our product is illustrated in this example.

A mixed thorium-uranous chloride solution was prepared (in which the thorium to uranium ratio=1) containing 5 g. total oxide/100 ml. Chloride ion was removed from 150 ml. of this solution by treating with an anion exchange resin (Amberlite IR–45) at room temperature. The resin had been freshly regenerated with ammonia.

The resin was added, 20 ml. at a time, with stirring until a total of 300 ml. of resin had been added. Stirring was continued until the pH of the mixture reached 3.7 and the specific conductance was $1.6\times10^{-3}$ mho/cm. The resin was removed by filtering through a fritted glass funnel. The deionization and filtration were carried out under a protective blanket of nitrogen. The deionized material was placed in a sealed glass pressure vessel under nitrogen and placed in an oven for 8 hours at 150° C.

After autoclaving, the product sol was black in color and did not settle on standing. The pH of the sol was 1.98 and specific conductance $6.9\times10^{-3}$ mho/cm. Electron microscopy showed the sol to consist of particles averaging 5 millimicrons in size.

The particles were separated from the dispersing medium by centrifuging the sol for 20 minutes at 15,000 r.p.m. and then examined by X-ray. The particles gave a diffraction pattern for a single poorly crystalline phase of the fluorite type. The lattice constant was 5.506 A.

The residue was heated in air for 3 hours at 700° C. and then re-examined by X-ray. The diffraction pattern was sharper and the lattice constant increased to 5.554 A. However, the fluorite crystal habit was not disrupted and no lines of a more highly oxidized form of uranium were displayed.

Example 2

In this run, the product was prepared by the alternate method. Sols of each of the components were used as starting material.

A thorium dioxide sol containing 5 g. oxide/100 ml. was prepared by deionizing a thorium chloride solution with freshly regenerated Amberlite IR–45 anion exchange resin.

A uranium dioxide sol containing 5 g. oxide/100 ml. was prepared in the same manner by deionizing a uranous chloride solution.

A mixture of the two sols having a total oxide content of 5 g./100 ml. and a Th/U ratio of 1 was prepared by mixing 60 ml. of the thorium dioxide sol with 60 ml. of the uranium dioxide sol.

The sol mixture was placed in a sealed glass pressure vessel under nitrogen and placed in an oven for 8 hours at 150° C. The pH and specific conductance of the sol were measured before and after autoclaving. The results were as follows:

Before autoclaving:
 pH _____ 3.3
 Specific conductance (mho/cm.) _____ $2.9\times10^{-3}$
After autoclaving:
 pH _____ 2.1
 Specific conductance (mho/cm.) _____ $7.1\times10^{-3}$ The product sol was a green-black color and did not settle on standing. Electron microscopy showed the particles to be aggregates of about millimicron sub-particles. The aggregate had a maximum size of about 15 millimicrons.

The dispersed phase was separated from the dispersing medium by centrifuging for 20 minutes at 15,000 r.p.m. and examined by X-ray. The diffraction pattern indicated a single crystalline phase which was of the flourite-type with a lattice constant of 5.496.

We claim:
1. A process for preparing a mixed thorium dioxide-uranium dioxide sol which comprises autoclaving in an inert atmosphere a composition chosen from the group consisting of (a) a mixture of hydrous oxides of thorium dioxide and uranium dioxide each in the +4 valence state and (b) a mixture of a salts of thorium (IV) and uranium (IV), in which some of the anion valence sites in each salt are filled with hydroxyl radicals, cooling and recovering the product sol.
2. The process as described in claim 1 in which the chosen composition is a mixture of reactive thorium dioxide and uranium dioxide sols.
3. The process as described in claim 2 in which the mixture of reactive thorium dioxide and uranium dioxide sols is prepared using separate preparation followed by mixing of the reactive sols.
4. The process as described in claim 1 in which the chosen composition is a mixture of basic salts of thorium and uranium (IV).
5. The process as described in claim 1 in which the total thorium and uranium concentration (as oxides) in the chosen composition is 1 to 150 grams per liter.

6. The process according to claim 1 wherein the thoria to urania mole percent range is 0.1–99.9 $ThO_2$ to 99.9–0.1 $UO_2$.

7. The process according to claim 1 wherein the autoclave heating is at a temperature of 100 to 200° C. for about 1 to 40 hours.

8. The process according to claim 1 wherein the inert atmosphere is nitrogen.

References Cited

UNITED STATES PATENTS

| | | | |
|---|---|---|---|
| 3,148,151 | 9/1964 | Fitch et al. | 252—301.1 |
| 3,150,100 | 9/1964 | Fitch et al. | 252—301.1 |
| 3,264,224 | 8/1966 | Fitch et al. | 252—301.1 |
| 3,265,626 | 8/1966 | Fitch et al. | 252—301.1 |

CARL D. QUARFORTH, *Primary Examiner.*

S. LECHERT, *Assistant Examiner.*